US011544754B2

(12) United States Patent
Farley et al.

(10) Patent No.: US 11,544,754 B2
(45) Date of Patent: Jan. 3, 2023

(54) REDEEMING ITEMS FROM AN ITEM STORE USING INFORMATION FROM MULTIPLE ACCOUNTS

(71) Applicant: Amazon Technologies, Inc., Seattle, WA (US)

(72) Inventors: Justin Farley, Bainbridge Island, WA (US); Mark Thill, Seattle, WA (US); David Prody, Gilbert, AZ (US); Juan Carlos Lopez Sanchez, Bellevue, WA (US); Justin Shane McRoberts, Seattle, WA (US); Daniel Micol-Ponce, Madrid (ES); Bradley Louis James Rosenfeld, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/998,895

(22) Filed: Aug. 20, 2020

(65) Prior Publication Data

US 2022/0058704 A1 Feb. 24, 2022

(51) Int. Cl.
*G06Q 30/02* (2012.01)
*G06Q 30/06* (2012.01)
(Continued)

(52) U.S. Cl.
CPC ..... *G06Q 30/0603* (2013.01); *G06Q 10/0838* (2013.01); *G06Q 10/105* (2013.01);
(Continued)

(58) Field of Classification Search
CPC ........... G06Q 30/0603; G06Q 10/0838; G06Q 30/0219; G06Q 30/0223; G06Q 30/0235; G06Q 30/0635
See application file for complete search history.

(56) References Cited

U.S. PATENT DOCUMENTS

| 7,024,389 B1 | 4/2006 | Watkins |
| 7,761,344 B2 * | 7/2010 | Smith .................... G06Q 30/04 705/26.2 |

(Continued)

OTHER PUBLICATIONS

"Webinar Recap: Simple Stores & Redemption Stores" (Live Webinar video recorded on Feb. 22, 2018 and published on Mar. 5, 2018 at https://blog.brightstores.com/2018/03/05/webinar-recap-simple-stores-redemption-stores/—hereinafter "BrightStores Blog") (Year: 2018).*

(Continued)

*Primary Examiner* — James M Detweiler
(74) *Attorney, Agent, or Firm* — Knobbe, Martens, Olson & Bear, LLP

(57) ABSTRACT

Features are disclosed for providing items from an item store to an item store consumer. An item store organizer can request an item store from an item redemption system based on item store parameters. The item store organizer can receive a single use token from the item redemption system to provide initial access to the item store. The item redemption system can validate the item store consumer based on the single use token. The item redemption system can further validate redemption requests from the item store consumer based on the item store parameters. The item redemption system can fulfill the redemption request based on payment information of the item store organizer and shipping information of the item store consumer. The item redemption system can transmit redemption information to the item store organizer based on fulfilling the redemption request.

20 Claims, 7 Drawing Sheets

(51) Int. Cl.
*G06Q 10/08* (2012.01)
*G06Q 10/10* (2012.01)
*H04L 9/40* (2022.01)
*G06Q 30/00* (2012.01)

(52) U.S. Cl.
CPC ..... *G06Q 30/0219* (2013.01); *G06Q 30/0223* (2013.01); *G06Q 30/0235* (2013.01); *G06Q 30/0635* (2013.01); *H04L 63/0853* (2013.01); *G06Q 30/0185* (2013.01)

(56) References Cited

U.S. PATENT DOCUMENTS

| | | | |
|---|---|---|---|
| 8,046,266 B1* | 10/2011 | Geller | G06Q 30/0223 705/14.1 |
| 8,190,519 B1* | 5/2012 | Angilivelil | G06Q 20/10 705/39 |
| 9,811,833 B1* | 11/2017 | Garber | G06Q 30/00 |
| 10,540,630 B2* | 1/2020 | Erez | G06Q 30/0222 |
| 2001/0007098 A1 | 7/2001 | Hinrichs | |
| 2001/0007099 A1* | 7/2001 | Rau | G06Q 30/0641 705/26.8 |
| 2003/0115140 A1 | 6/2003 | Pal | |
| 2003/0126042 A1 | 7/2003 | Beegle | |
| 2016/0098714 A1 | 4/2016 | Jinks | |

OTHER PUBLICATIONS

"BrightStores 101_Company Stores, Simple stores, & Order Management" (Live Webinar video recorded and published online on Jan. 31, 2019 at https://vimeo.com/314555056) (Year: 2019).*

Search Report and Written Opinion dated Dec. 6, 2021 issued in corresponding PCT Application No. PCT/US2021/046450.

* cited by examiner

REDEEMING ITEMS FROM AN ITEM STORE USING INFORMATION FROM MULTIPLE ACCOUNTS

BACKGROUND

Retailers and merchants involved in commerce often provide items for purchase by a consumer via an electronic store, made available via a website or mobile application ("mobile app"). A consumer can often select an item to purchase (e.g., redeem) from a number of items made available by the store. For example, the electronic store may offer a selection of items, such as food, electronics, books, household goods, services, etc. Items can be purchased using payment information stored in the consumer's account with the electronic store or through a third party payment service, and the items can be shipped to the consumer using shipping information stored in the consumer's account. For example, a consumer may purchase a clothing item or book from an electronic store using the consumer's credit card information stored in the consumer's account with the electronic store, and the operator of the electronic store or another fulfillment provider may ship the item to a physical address of the consumer stored in the consumer's account. If the consumer is purchasing an item from the electronic store that is requested or required by their employer, or another entity with which they are associated, and the employer is to provide for payment, the consumer must either use the payment information of the employer (such as a company credit card) stored in the consumer's account (and submit an expense report), or use their own payment information stored in the consumer's account (and seek reimbursement). Alternatively, the employer may select and pre-purchase items from an electronic merchant that it wishes to distribute to employees. The employer may purchase the items with payment information stored in the employer's account with the electronic merchant, and the items may be shipped to the employer using employer shipment information stored in the employer's account. Alternatively, the employer can provide shipping information to the electronic merchant for each employee so that the items may be shipped directly to the employees. The employer typically purchases items based on actual or estimated employee demand, and if shipping the items directly to employees, the employer typically obtains the information from internal records. However, accurately predicting or determining the number of employees who will actually desire or require an item, and accurately maintaining a database of employee addresses, is difficult to do using existing approaches and technology.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
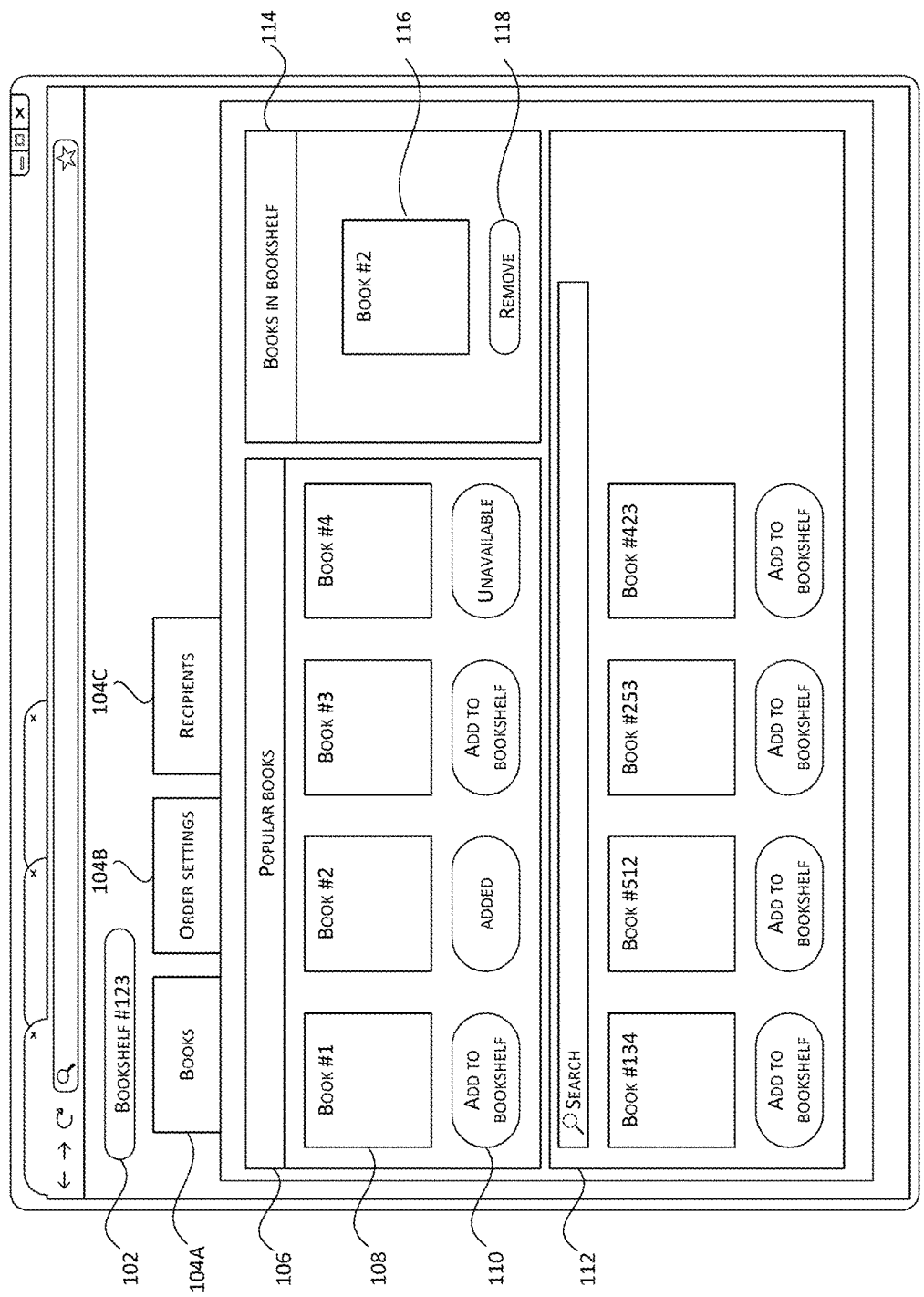
FIG. 1 depicts an example user interface that allows an entity to manage an electronic item store or "bookshelf" that is made available to consumers associated with the entity.

The present disclosure generally relates to an item redemption system that enables entities (such as corporations, businesses, clubs, organizations, groups, etc.) to set up an electronic store of items available from an electronic catalog, and that enables consumers (such as employees, club members, etc.) to redeem items from the item store. The item redemption system may interface with, or be implemented by, an electronic retail system that provides the electronic catalog and maintains entity accounts or profiles for entities who purchase items from the retail system, and consumer accounts or profiles for consumers who purchase items from the retail system. Some consumers having consumer accounts with the retail system may also be employees, members, etc. of an entity that has an entity account with the retail system. Each entity account may include payment, shipping, and other information of the entity. Each consumer account may include payment, shipping, and other information of the consumer. As the electronic retail system is independent of, and distinct from, the entity and the consumers, the account information of the entities and the account information of the consumer, are stored such that an entity account cannot be accessed by a consumer, and a consumer account cannot be accessed by an entity, without appropriate access credentials. This separation of account data (which is both appropriate and necessary for numerous reasons) presents a technical problem when a consumer associated with an entity wishes to purchase an item to be paid for by the entity. This technical problem is generally resolved, as noted above, by requiring the consumer to purchase the item using either payment information directly disclosed by the entity to the consumer (such as a company credit card) and stored in the consumer's account, or the consumer's own payment information stored in the consumer's account. However, this technical problem is resolved by the item redemption system without requiring the consumer to use either of the foregoing, without providing the consumer access to the entity's account information, and without providing the entity access to the consumer's account information. More specifically, using the item redemption system of the present disclosure, (1) the entity can select items (without pre-purchasing them) from the retail system's electronic catalog to make available to consumers of the retail system in an item store hosted by the retail system; (2) a consumer can redeem an item from the item store hosted by the retail system; (3) the item redemption system can process the entity's payment information as stored in its entity account for the redeemed item; and (4) the item redemption system can process the consumer's shipping information as stored in their consumer account to ship the redeemed item to the consumer. The payment information may be information describing a method of payment, credit card information, wire transfer information, direct billing information, etc. Shipping information may include a designation of an address to ship the item (e.g., the shipping information may include a home address of the consumer and/or a preferred method of shipment).

Additional technical problems may also be addressed by the item redemption system of the present disclosure. For example, as the shipping information for redeemed items is obtained from consumer accounts already maintained by the retail system, the item redemption system also substantially reduces the need for the entity or the retail system to store and maintain separate databases of address information for consumers, thus conserving data storage. In addition, by enabling an entity to select items from an already existing electronic catalog, for which the inventory is already managed by the retail system, the item redemption system allows the entity to avoid pre-purchasing or bulk-buying an unnecessary or excessive quantity of items prior redemption by consumers. Thus, the entity need not be concerned about returning any leftover inventory or purchasing upfront bulk inventory. Further, the item redemption system provides for more efficient distribution of redeemed items directly to consumers on demand, rather than requiring an entity to estimate demand, bulk-buy the items, and redistribute the items to consumers. Thus, an entity can avoid storing, managing, and shipping inventory, as the items are stored, managed, and distributed by the retail system. Moreover, redistributing the items consumers typically requires the entity to have access to, or be in possession of consumers' shipping information, which information consumers may not wish to divulge. Because the item redemption system is capable of obtaining a consumer's shipping information from the consumer's account with the retail system without providing the entity access to the consumer's account (or otherwise sharing the consumer's shipping information with the entity), the item redemption system provides consumers with additional data privacy.

As noted above, using the item redemption system, an entity (which may also be referred to herein as an "item store organizer") can request that a retail system generate from the retail system's electronic catalog, an item store containing a limited selection of items from the electronic catalog. Consumers associated with the entity (which may also be referred to herein as "item store consumers") may access the item store hosted by the retail system, and select items from among those available for redemption. For example, the electronic catalog includes a selection of one million books, while the item store includes fifteen books from the electronic catalog as designated by the item store organizer. In order to determine the boundaries of the item store (e.g., the items to be included in the item store), the item store organizer may, in addition to requesting the generation of the item store using the item redemption system, provide one or more item store parameters corresponding to the particular item store. The one or more item store parameters may correspond to parameters and/or features of the item store. For example, the item store parameters designate items to be included in the item store, a number of redemptions available for each item store consumer, a maximum (or minimum) price per redemption, an expiration date of the item store, or any other parameters. Therefore, the item store organizer can curate the items that are included within the item store and made available to the item store consumers.

Prior to accessing the item store in order to redeem items, the item store organizer and/or the retail system may verify the item store consumer in order to ensure that valid, desired item store consumers are accessing the item store. In order to validate the item store consumers, the item store organizer may, in addition to requesting the generation of the item store according to item store parameters (e.g., items to include in the item store), request the generation of unique, single use tokens for use in accessing the item store. An item store consumer may use a single use token once in order to access the item store. Subsequent to the item store consumer using a single use token to access the access store, the retail system can deactivate the single use token such that an item store consumer cannot reuse a previously used single use token. Upon using the single use token to access the item store, the retail system may validate the consumer account associated with the single use consumer. For example, the retail system validates the consumer account in order that the consumer account can, subsequent to the use of the single use token to access the item store, access the item store without the use of a single use token. In some embodiments, as part of the validation of the consumer account, the retail system links the consumer to the item store. After being validated by the retail system, the consumer account may re-access the item store without reusing the single use token and the retail system may deactivate the single use token.

The term "item" is used herein to any good, product or service, whether physical or digital, that can be made available for redemption, purchase or other acquisition electronically or via the Internet. As used herein, the term "item," in addition to having its ordinary meaning, is used interchangeably to refer to an item itself (e.g., a particular product) and to its description or representation in a computer system, such as in an electronic catalog. As will be apparent from the context in which it is used, the term is also sometimes used herein to refer only to the item itself or only to its representation in the computer system.

FIG. 1 depicts an example client interface 100 for managing an item store that offers a determined selection of items for redemption by item store consumers. The example client interface 100 is illustrative of an interface that the retail system generates and presents to an item store organizer when interacting with the item redemption system. In the example of FIG. 1, the client interface 100 includes a number of books that the item store organizer has added or is considering adding to the item store the retail server has generated on the item store organizer's behalf. Thus, in the illustrated example, the item store is referred to as a "bookshelf" and the client interface 100 enables the item store organizer to add books to, and remove books from, the bookshelf. As will be described in more detail below, the retail system may present the item store or "bookshelf" to an item store consumer so that the consumer can browse and redeem books from it. It will be understood that FIG. 1 is illustrative only, and a retail system, via the item store, may offer any type or combination of items desired by the item store organizer, such as groceries, clothing, office supplies, training services, etc.

Via the client interface 100, the item store organizer may curate an item store including items from the retail system's electronic catalog based on one or more item store parameters. The retail system may use the item store parameters to generate the item store and/or identify the boundaries or limits of the item store for item store consumers. For example, item store parameters may include, but are not limited to, an identification of at least one item to include in the item store, a price restriction for at least one item in the item store, a maximum number of redemptions from the item store, a deactivation date for a single use token, identifiers of item store consumers, etc. In the bookshelf example, one of the item store parameters is a list of books for the bookshelf.

Based on the books that have been selected for inclusion in the bookshelf, the client interface 100 may include a designation of the books that are currently in the bookshelf. For example, the client interface 100 includes a preview of the bookshelf that the retail system will provide to the item store consumers. The client interface 100 may further include other settings in order to modify the one or more item store parameters of the bookshelf. The books included in the bookshelf may be any format of books. For example, the books are one or more of electronic books ("ebooks"), physical books, audible books, new books, used books, hardcover books, paperback books, or any other representation of a book.

In some embodiments, the client interface 100 identifies multiple items stores generated by the retail system at the request of the item store organizer. For example, the item store organizer has requested, and the retail system generates and hosts, multiple bookshelves where a first subset of item store consumers may access a first bookshelf and a second subset of item store consumers may access a second bookshelf. Via the client interface 100, the item store organizer can select different books and make them available to different subsets of item store consumers using different bookshelves. For example, the item store organizer may make certain books available to certain item store consumers and not available to other item store consumers. In another example, the retail system may provide the same item store consumer with access to multiple bookshelves of the same item store organizer. Conversely, the same item store consumer may obtain access to multiple bookshelves, but the retail system may generate and host each bookshelf on behalf of a different item store organizer.

Returning to FIG. 1, the client interface 100 may include an item store or "bookshelf" identifier 102. The bookshelf identifier 102 may identify a particular bookshelf and provide information about the particular bookshelf. The item store organizer may toggle between various bookshelves using the bookshelf identifier 102. For example, the item store organizer may interact with the client interface to select books for a first bookshelf and select books for a second bookshelf by using the bookshelf identifier 102 to identify each bookshelf. The bookshelf identifier 102 may correspond to any numerical, alphabetical, alphanumerical, or symbolical string. For example, the bookshelf identifier 102 may correspond to the order of generation. The bookshelf identifier 102 may identify relationships between bookshelves. For example, a first bookshelf requested by the item store organizer may correspond to "Bookshelf #1" and a second bookshelf requested by the item store organizer may correspond to "Bookshelf #2." In some embodiments, different bookshelves are not related via the bookshelf identifier 102. In the example of FIG. 1, the bookshelf identifier 102 identifies that the active bookshelf is "Bookshelf #123."

The client interface 100 may further include a first interface 104A, a second interface 104B, and a third interface 104C. The client interface 100 may include a book interface 104A. The particular bookshelf, based on the bookshelf identifier 102, may correspond to a number of books as displayed by the book interface 104A. As will be further discussed, the book interface 104A may further include a plurality of interfaces with which the item store organizer may interact in order to customize the bookshelf and/or obtain information about the bookshelf. The book interface 104A may further include books that have been selected for inclusion in the bookshelf. The client interface 100 may further include a settings interface 104B. The settings interface 104B identifies one or more user configurable settings with which the item store organizer can modify the client interface 100. For example, the settings of the settings interface 104B corresponds to item store parameters. The item store organizer may interact with the settings interface 104B to adjust how the bookshelf is presented to item store consumers. For example, the item store organizer, through the settings interface 104B, may designate a number of redemptions that each item store consumer may use, the expiration date of one or more tokens, the expiration date of the bookshelf, a maximum spend per redemption, a maximum spend per item store consumer, or other settings. The client interface 100 may further include a recipients interface 104C identifying single use tokens generated by the item redemption system for the item store organizer. In some embodiments, the recipients interface 104C identifies tokens that have been deactivated based on use by an item store consumer. For example, the recipients interface 104C may include a first designation of tokens that have been generated by the item redemption system and a second designation of tokens that have been deactivated. The recipients interface 104C may not identify item store consumers and/or the books from a particular redemption. The recipients interface 104C may further include an indication of a number of previous redemptions for each token.

The book interface 104A of the client interface 100 may further include various interfaces including a first interface 106, a second interface 112, and a third interface 114. The book interface 104A may include a book metrics interface 106. The book metrics interface 106 includes a books grouping 108 identifying books that the item store organizer, through the retail system, may add to the bookshelf according to one or more metrics. The books grouping 108 may correspond to any metric. For example, the item store organizer may group the books grouping 108 according to most frequently purchased books, most frequently redeemed books, previously redeemed books, alphabetical order, price metrics, time metrics, books grouped into certain fields (e.g., books about botany), suggested books, etc. The books grouping 108 may further correspond to any time metric. For example, the books grouping 108 may include the most popular books over a given day, week, month, year, etc. The books grouping 108 may include a short description of the books such as a cover page, a description, an abstract, a title page, an associated drawing, etc. The book metrics interface 106 may further include an interactive display 110 such that the item store organizer can add books to or remove selected books from the bookshelf. Further, the book metrics interface 106 may identify one or more of books that the item store organizer previously added to the bookshelf or books that are unavailable. For example, where a book is currently out of stock, the book metrics interface 106 may identify the book as being unavailable. In the example of FIG. 1, the item store organizer, through the retail system, may add "Book #1" and "Book #3" to the bookshelf; however, previously added "Book #2" and "Book #4" are indicated as unavailable.

The book interface 104A of the client interface 100 may further include a search interface 112. The search interface 112 includes a search bar that the item store organizer can use to query an electronic catalog of items available for acquisition (e.g., particular books to add to the bookshelf). The retail system may store the electronic catalog in an item data store. The item store organizer may use one or more search criteria when querying the electronic catalog. For example, the item store organizer may search the electronic catalog for books related to a first search criteria: "gardening" and a second search criteria: "published in 2010." The item store organizer may search the electronic catalog through the search interface 112. The search interface 112 may display a number of books that satisfy the query. The search interface 112 may further include book designations of books that satisfy the query. Further, the search interface 112 may present the results of the search to the item store organizer and the item store organizer may select one or more books from the search results to include in the bookshelf. For example, the item store organizer may interact with the search interface 112 to add books to the bookshelf or remove books from the bookshelf. As illustrated in FIG. 1, the item store organizer may add "Book #134," "Book #512," "Book #253," and "Book #423" to the bookshelf.

The book interface 104A of the client interface 100 may further include an active bookshelf interface 114. The active bookshelf interface 114 identifies an active bookshelf including one or more books. The active bookshelf interface 114 may further include a second book identifier 116 that identifies the books that have been added to the bookshelf. The second book identifier 116 includes a designation of the books that have been added such as such as a cover page, a description, an abstract, a title page, an associated drawing, etc. The active bookshelf interface 114 may further include a second interactive display 118 such that the item store organizer can, through the retail system, remove selected books from the bookshelf. In the example of FIG. 1, the item store organizer added "Book #2" to the bookshelf and subsequently removed by the item store organizer. The second interactive display 118 to perform other actions related to the bookshelf. For example, the item store organizer may interact with the second interactive display 118 to designate an expiration date and/or expiration time for a given book, search for books related to a given book (e.g., books by the same author, books in the same subject, etc.), or other actions.

Figure 2:
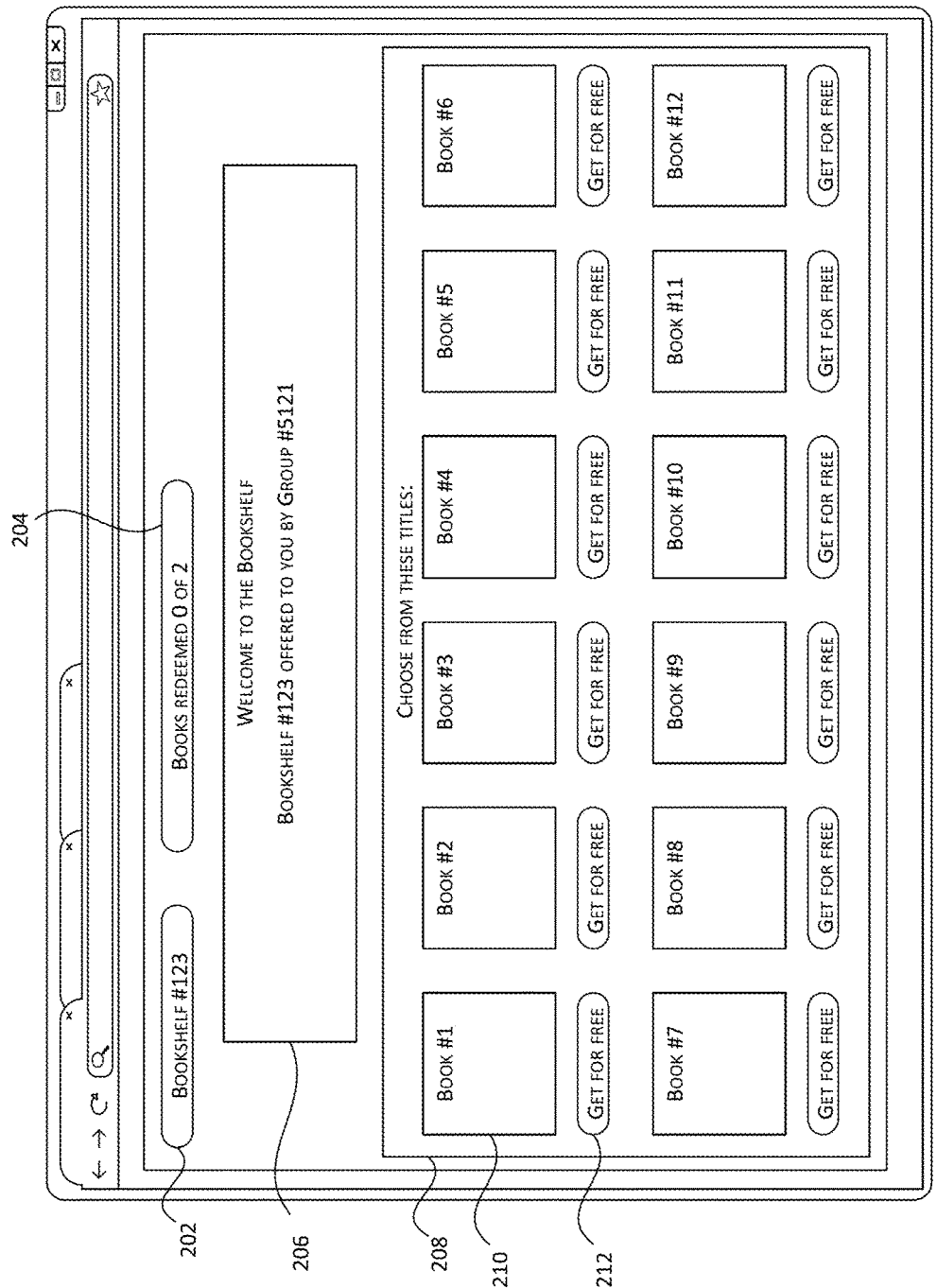
FIG. 2 depicts an example user interface that allows a consumer associated with an entity to redeem items, such as books, from the electronic item store or "bookshelf."

FIG. 2 depicts an example client interface 200 for allowing an item store consumer associated with an item store organizer to redeem an item from an item store. The example client interface 200 is illustrative of an interface that the retail system generates and presents to an item store consumer when interacting with the item store. In the example of FIG. 2, the item store includes a number of books that the item store consumer can redeem from the item store the retail server generated. Thus, in the illustrated example, the item store is referred to as a "bookshelf" and the client interface 200 enables the item store consumer to redeem books from the bookshelf. As will be described in more detail below, through the interface 200, the retail system presents the item store or "bookshelf" to an item store consumer so that the consumer can browse and redeem books from the item store. It will be understood that FIG. 2 is illustrative only, and a retail server, via the item store, may offer any type or combination of items desired for redemption by the item store consumer, such as groceries, clothing, office supplies, training services, etc. Via the client interface 200, the item store consumer may redeem items from the item store including items from the retail system's electronic catalog based on the item store parameters. The example client interface 200 may correspond to the example client interface 100 and may represent a consumer-facing interface whereas the example client interface 100 may represent an organizer-facing interface. Based on the books that have been selected for redemption by the item store consumer through the client interface 200, the retail system may initiate a redemption process. The retail system may initiate the redemption process to include item store organizer information and item store consumer information. For example, the books are redeemed according to payment information of the item store organizer and shipping information of the item store consumer. Further, the retail system may notify the item store organizer that a redemption has occurred.

The client interface 200 may further include a first identifier 202, a second identifier 204, and a third identifier 206. The client interface 200 may include a bookshelf identifier 202. The bookshelf identifier 202 identifies the bookshelf that is being browsed by the item store consumer. The bookshelf identifier 202 may differentiate between multiple bookshelves. In the example of FIG. 2, the bookshelf identifier 202 identifies the bookshelf being browsed by the item store consumer as "Bookshelf #123."

The client interface 200 may include a redemption identifier 204. The redemption identifier 202 identifies a number of redemptions by a given item store consumer. For example, if an item store consumer has previously redeemed three books from the bookshelf, the redemption identifier 204 may indicate that three books have been redeemed. Further, the redemption identifier 202 may identify a number of available redemptions for the item store consumer with respect to the chosen bookshelf. For example, the redemption identifier 202 may indicate that each item store consumer is able to redeem two books from the bookshelf. Further, the redemption identifier 202 may indicate that the item store consumer has redeemed a certain number of the available redemptions. In the example of FIG. 2, the item store consumer has previously redeemed zero books of the available two redemptions, and therefore, the item store consumer may redeem two books. The retail system may update the redemption identifier 204 after a book has been redeemed or after a book has been returned. In some embodiments, the retail system updates the redemption identifier 204 after receipt of the book by the item store consumer or the item store organizer. In other embodiments, the retail system updates the redemption identifier 204 at other times.

The client interface 200 may include a message 206. The message 206 includes certain messages offered by the item store organizer. In some embodiments, the message 206 includes a message particular to the corresponding item store consumer. In some embodiments, the message 206 includes identifying information about the item store organizer and/or the bookshelf. In the example of FIG. 2, the message 206 includes a welcome message "Welcome to the bookshelf" and an identification of the bookshelf and item store organizer "Bookshelf #123 offered to you by group #5121."

The client interface 200 may further include an active bookshelf interface 208. The active bookshelf interface 208 identifies the books that are included in the bookshelf. The active bookshelf interface 208 may further identify the books that are available for redemption by the item store consumer. In some embodiments, the bookshelf includes a plurality of books and the active bookshelf interface 208 identifies a subset of the books based on one or more of the plurality of books being unavailable. In other embodiments, the active bookshelf interface 208 identifies a subset of the plurality of books based on the popularity of the books, the most relevant books, the most redeemed books, etc. The retail system may rank the books according to these or other parameters. Further, the item store consumer can adjust the ranking of the books. The active bookshelf interface 208 may further include a plurality of book identifiers 210 that identify the books that have been added to the bookshelf and that are available for redemption. The book identifier 210 may include a designation of the books that have been added such as such as a cover page, a description, an abstract, a title page, an associated drawing, etc. The active bookshelf interface 208 may further include an interactive display 212 from which the item store consumer can redeem selected books from the bookshelf. In the example of FIG. 2, the item store consumer redeems "Book #1," "Book #2," "Book #3," "Book #4," "Book #5," "Book #6," "Book #7," "Book #8," "Book #9," "Book #10," "Book #11," or "Book #12" by interacting with the appropriate "Get for free" display. The interactive display 212 may further indicate books that the item store consumer previously redeemed. In some embodiments, through the interface 200, the item store consumer can redeem the same book multiple times. In other embodiments, the interface 200 restricts the item store consumer from redeeming the same book multiple times. For example, where the item store consumer redeems a physical book, the item store consumer may redeem a book multiple times and where the item store consumer is redeeming ebooks, the item store consumer may only redeem the book once. The item store consumer may interact with the interactive display 412 to receive further information about the books. For example, the item store consumer interacts with the interactive display 412 in order to see properties of a selected book such as book information, author information, an expiration date, similar books, or other book information.

Figure 3:
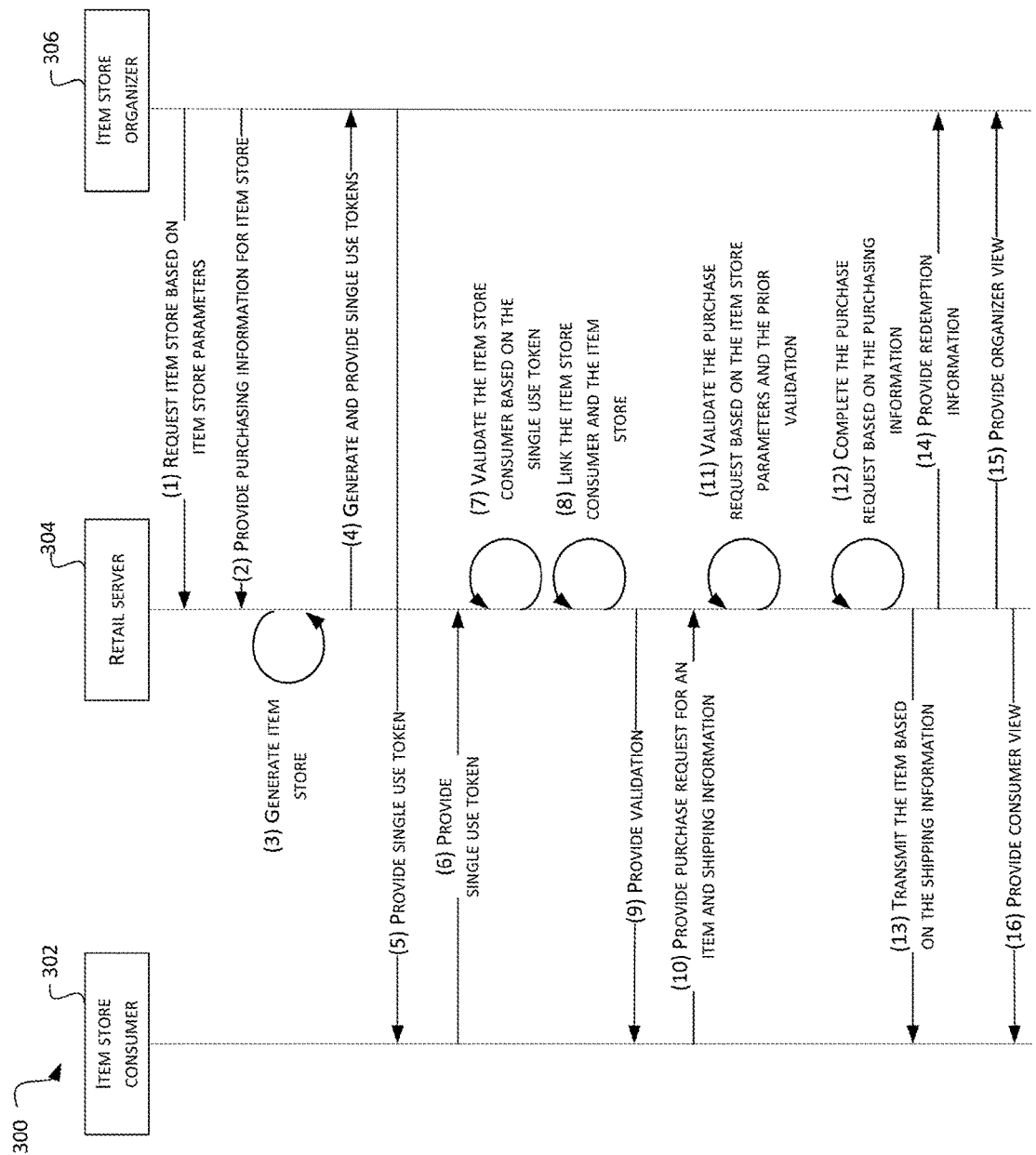
FIG. 3 depicts an example workflow for managing an item store and redemption requests related to the item store.
Figure 4:
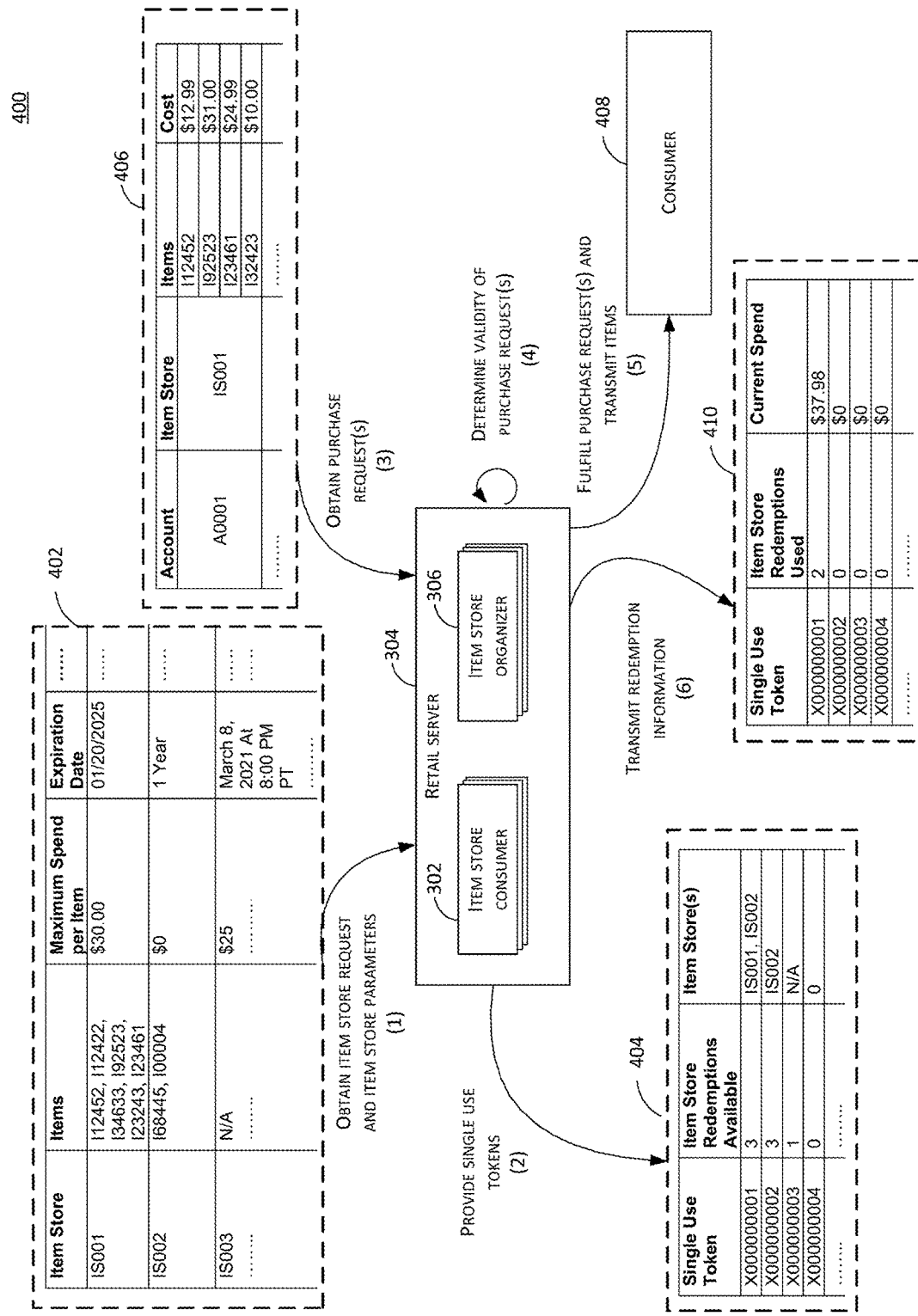
FIG. 4 depicts a schematic diagram of a retail server including item store organizers and item store consumers in accordance with aspects of the present disclosure.

FIG. 3 depicts interactions among various components further shown in FIG. 4 for use in managing an item redemption system implemented by a retail server of a retail system in accordance with aspects of the present disclosure. The retail server may be in communication with one or more accounts corresponding to item store organizers and one or more accounts corresponding to item store consumers. The one or more accounts corresponding to item store organizers and the one or more accounts corresponding to item store consumers may be stored in an account data store. In some embodiments, the one or more accounts corresponding to the item store organizers may be stored separately from the one or more accounts corresponding to item store consumers. Further, the one or more accounts corresponding to the item store organizers may be stored in a first account data store and the one or more accounts corresponding to item store consumers may be stored in a second account data store separate from the first account data store. As shown in FIG. 3 at (1), the item store organizer 306 requests that an item store be generated by the retail server 304 based on one or more item store parameters. For example, an item store parameter may include an identification of at least one item to include in the item store, a price restriction for at least one item in the item store, a maximum number of redemptions from the item store, a deactivation date for a token, identifiers of item store consumers, a type of redemption that is available, etc. When an item store is generated by the retail server 304, the retail server 304 may set various configurable parameters such as items in the item store, a number of redemptions per consumer, expiration date, maximum cost, etc. For example, the item store organizer 306 may request that the item store generated by the retail server 304 offer five items for redemption by an item store consumer and limit each item store consumer to two redemptions from the item store. The retail server 304 may generate the item store such that the item store offers items for one or more of purchases, rentals, subscriptions, access requests, or other services. The item stone organizer 306 may provide the item store parameters to the retail server 304 in order for the retail server 304 to generate the item store for the item store organizer 306. In some embodiments, the item store organizer 306 provides the item store parameters to other components of the system.

At (2), the item store organizer 306 provides payment information for the item store in order to provide a method of payment for items redeemed from the item store. The retail server 304 may store the payment information with the item store such that when an item store consumer interacts with the item store, the payment information may effectuate an item redemption from the item store. The payment information may include a charge account number, a bank account number, a credit card number, and/or other payment information of the item store organizer. In some embodiments, the item store organizer 306 provides multiple forms and/or types of payment information. For example, the item store organizer provides a charge account number to be used for redemptions made from a first item store and a credit card number for redemptions made from a second item store.

At (3), the retail server 304 generates the item store based on the item store parameters in order to provide an item store for browsing by the item store consumers. An item store organizer may request the item store, and the retail server 304 may generate and host an item store including a subset of items from an electronic catalog accessed by the retail server. For example, where the electronic catalog includes books, the item store may include a subset of the books in the electronic catalog. In some embodiments, the items may include subscriptions from the electronic catalog. For example, where the electronic catalog includes periodicals, the item store may include subscriptions to periodicals. Further, the item store may offer subscriptions that allow an item store consumer to subscribe to receive periodicals over a period of time. In some embodiments, the retail server 304 does not generate the item store and retrieves an already generated item store from a data store. In other embodiments, other components of the system generate and/or host the item store on behalf of the item store organizer. The retail server 304 may automatically generate a subset of items to include in the item store based on the item store parameters. The subset of items may include at least the items as identified by the one or more item store parameters.

At (4), in response to generating the item store according to the item store parameters, the retail server 304 generates and provides single use tokens to the item store organizer 306. Each single use token may provide an item store consumer with limited access to the item store. An item store consumer 302 may use a single use token once before the single use token is deactivated by the retail server 304. For example, a single use token may provide an item store consumer 302 with initial access to the item store when presented by the item store consumer 302 to the retail server 304. In some embodiments, the single use tokens are general tokens and the retail server 304 may not associate a token with a particular item store consumer 302. As such, the single use token may not contain any identifying feature linking the single use token to a particular item store consumer. In some embodiments, each single use token provides, for an item store consumer, access to an item store a limited number of times. In some embodiments, the single use tokens are not generated and provided by the retail server 304 and are generated and provided by a different component of the system. In some embodiments, the retail server 304 does not provide the single use tokens to the item store organizer 306; rather, the retail server 304 provides the single use tokens directly to the item store consumer 302. Each single use token may be any unique numerical, alphabetical, alphanumerical, or symbolical string. In some embodiments, the single use token is embedded in a link that an item store consumer may use to access the item store. In some embodiments, the retail server 304 may not generate or provide single use tokens to the item store organizer 306. For example, the retail server 304 can enable one or more authentication procedures for the item store organizer 306 to authenticate the item store consumer 302.

At (5), subsequent to receiving the single use tokens, the item store organizer 306 provides a single use token of the single use tokens to the item store consumer 302 in order to provide initial access of the item store for the item store consumer 302. The item store consumers 302 may correspond to customers, employees, members, etc. of the item store organizer 306. In some embodiments, the item store consumer 302 do not have such an association with the item store organizer 306, but the item store organizer may still choose to provide the item store consumer 302 with a single use access token. The item store organizer may provide the single use token to the item store consumer in an email, text message, etc. In some embodiments, the single use tokens are provided to the item store consumer 302 by a separate component such as the retail server 304, which can provide a single use token to an item store consumer via the consumer's account with the retail server, or through an email, text message, etc. In some embodiments, the item store organizer 306 does not provide a single use token of the single use tokens to the item store consumer 302. Further, the item store organizer 306 may authenticate the item store consumer 302 via an authentication procedure. The authentication procedure may include one or more of a handshake, a sign-on procedure, or account verification to provide initial access of the item store for the item store consumer 302. For example, the item store organizer 306 can initiate a secure handshake with the item store consumer 302 in order to authenticate the item store consumer 302 and provide initial access of the item store for the item store consumer 302. Further, for example, the item store organizer 306 may authenticate the item store consumer 302 when the item store consumer 302 provides login information via a sign-on procedure. Based on the authentication procedure, the item store organizer 306 may provide the item store consumer 302 with account authentication. The account authentication may include one or more of a certificate, a token, or other designation that when presented to the retail server 304 enables initial access to the item store. In some embodiments, the account authentication may include a link that enables initial access to the item store.

At (6), an item store consumer 302 who received a single use token provides the single use token to the retail server 304 in order to gain initial access to the item store. The single use token may be included in a link to the item store or may be input by the item store consumer when requesting access to an item store. For example, the item store consumer 302 may use the single use token to access the item store by interacting with a link. In some embodiments, the item store consumer 302 may not receive a single use token. Further, the item store consumer 302 may utilize an account authentication provided by the item store organizer 306 via an authentication procedure. The item store organizer 306 can, prior to allowing the item store consumer to initially access the item store, authenticate the item store consumer 302 via the authentication procedure. For example, the item store consumer 302 may utilize a single sign-on procedure provided by the item store organizer 306 such that the item store consumer 302 is able to initially access the item store after the use of the single sign-on procedure. Further, for example, the item store consumer 302 may gain account authentication via an authentication procedure and provide the account authentication to the retail server 304 in order to gain initial access to the item store. The account authentication may allow the item store organizer 306 to confirm that the item store organizer 306 wishes to enable initial access by the item store consumer 302 to the item store.

At (7), the retail server 304 validates the item store consumer 302 based on the single use token provided by the item store consumer 302 in order to provide continued access to the item store for the item store consumer 302. Validating the item store consumer 302 may include receiving the single use token and identifying that the single use token has not previously been used to validate an item store consumer. For example, the retail server 304 may compare the single use token with a list of active single use tokens to ensure the single use token has not previously been used for validation of an item store consumer. The retail server 304 may also store information indicating whether the single use token has been used to validate another item store consumer. In the event, that the single use token provided by the item store consumer 302 has previously been used to validate another item store consumer, the retail server 304 will deny the request to validate the item store consumer 302. Further, in the event that the item store consumer 302 is validated, after validating the item store consumer 302, the retail server 304 will update the particular single use token to indicate that the token was used to validate an item store consumer. In some embodiments, the retail server 304 does not store information about which item store consumer corresponds to which single use token. In other embodiments, the retail server 304 provides information to the item store organizer that a single use token has been used, but does not provide information about the item store consumer that used the single use token. Further, after the item store consumer 302 provides the single use token to the retail server 304, the retail server may invalidate (e.g., deactivate) the single use token such that an item store consumer 302 can no longer use the particular single use token to access the item store. Instead, the retail server 304 may limit each single use token such that the tokens provide initial, onetime access to the item store.

At (8), the retail server 304 links the item store consumer 302 to the item store based on validating the single use token. The retail server 304 may link the item store consumer 302 to the item store such that a request to access an item store by the item store consumer 302 is linked to the item store. Further, by linking the item store consumer 302 to the item store, the item store consumer 302 is provided continued access to the item store and may access the item store without the single use token. The item store consumer 302 may further provide additional identification with the single use token. For example, after using the single use token, the retail server 304 may prompt the item store consumer 302 to provide additional information such as an email address. For example, the item store consumer 302 may further provide an e-mail address of the item store consumer 302 after providing the single use token. The retail server 304 may link the email address (or other login information) to the item store organizer based at least in part on the single use token such that the item store consumer 302 can use the email address to continuously access the item store without requiring the use of a single use token. For example, when the item store consumer 302 navigates to the item store, the retail server 304 may confirm that the item store consumer 302 is authorized to access the item store based on the email address or other login information of the item store consumer 302. The retail server 304 may store login information of item store consumers 302 authorized to access the item store.

At (9), the retail server 304 provides the validation to the item store consumer 302 in order to provide continued access by the item store consumer 302 to the item store. The retail server 304 may process the validation and provide an indication to the item store consumer 302 that the item store consumer 302 is validated to access the item store. In some embodiments, the retail server provides an updated link for the item store consumer 302 to access the item store.

At (10), the item store consumer 302 provides a redemption request and shipping information to a retail server 304 in order to redeem an item. The redemption request may include a request for the item from the item store by the item store consumer 302. The item store consumer 302 may interact with the item store in order to select an item for redemption and may submit a redemption request based on these interactions. The redemption request may include a purchase request for an item from the item store. For example, the redemption request may include a request by the item store consumer 302 for the item store organizer 306 to purchase an item from the item store for the item store consumer 302. In some embodiments, the redemption request may include a rental request for an item from the item store. For example, the redemption request may include a request by the item store consumer 302 for the item store organizer 306 to rent an item from the item store for the item store consumer 302. In other embodiments, the redemption request may include a subscription request for one or more items from the item store. For example, the redemption request may include a request by the item store consumer 302 for the item store organizer 306 to purchase a subscription associated with the item store for the item store consumer. Further, for example, the subscription can enable periodic or non-periodic purchasing of items from the item store. In other embodiments, the redemption request may include an access request for one or more services associated with the item store. For example, the redemption request may include a request to access a digital content service associated with the item store.

At (11), the retail server 304 validates the redemption request based on the item store parameters. The validation may involve a two-step process where the retail server 304 validates the item store consumer 302. In a first step, the retail server 304 may validate the redemption request by determining whether the item store consumer 302 has previously been validated based on a single use token. In a second step, the retail server 304 may validate the redemption request by determining whether the redemption request satisfies the item store parameters. For example, the retail server 304 identifies that the redemption request is for a valid item as identified by the item store parameters, that the item store consumer 302 has redemptions available, that the price constraints are satisfied, etc. In some embodiments, if the retail server 304 does not validate one or more of the item store consumer 302 or the redemption request, the retail server 304 denies the redemption request. For example, if the item store consumer 302 has not previously been validated using a single use token or the redemption request does not satisfy the price constraints, the redemption request is denied.

At (12), the retail server 304 completes the redemption request based on the payment information. Based on validating the redemption request, the retail server 304 may charge an account from the payment information of the item store organizer 306. In some embodiments, the retail server 304 periodically charges an account from the payment information of the item store organizer such as when the redemption request corresponds to a subscription request. In other embodiments, when the redemption request is a rental request, the retail server 304 may initially charge an account from the payment information of the item store organizer 306 and, in the event that the item store consumer fails to return the rental by the return date, the retail server 304 may subsequently charge an account from payment information of the item store consumer 302.

At (13), the retail server 304 transmits the item to the item store consumer 302 based on the shipping information. Based on validating the redemption request and completing the redemption request based on the payment information, the retail server 304 may transmit the item to the item store consumer 302. The retail server 304 may transmit the item to an address parsed, by the retail server 304, from the shipping information of the item store consumer 302. In some embodiments, the address is a physical address, an electronic address, or any other type of address or location.

At (14), the retail server 304 provides redemption information to the item store organizer 306 in order to notify the item store organizer 306 that a redemption has occurred. The redemption information may include information about the redemption such as a cost of the redemption, a single use token used to initially access the item store, the time and date of the redemption, or other redemption information. In some embodiments, when the redemption request is a rental request, the redemption information may include a rental period or a return date. The redemption information may not include information specific to the item store consumer 302 such as the shipping information, item information, or personal account information of the item store consumer 302.

At (15), the retail server 304 provides an organizer view of the redemption to the item store organizer 306. The organizer view of the redemption may include redemption information for a number of redemptions from any number of item stores associated with the item store organizer 306. The organizer view can allow the item store organizer 306 to access or view prior item store redemptions and view redemption information associated with the prior item store redemptions. Further, the organizer view may not provide access to or display information specific to the item store consumer 302 such as the shipping information, item information, or other personal account information of the item store consumer 302.

At (16), the retail server 304 provides a consumer view of the redemption to the item store consumer 302. The consumer view of the redemption may include information for a number of prior redemptions by the item store consumer 302 from any number of item stores. The consumer view can allow the item store consumer 302 to access or view information specific to the item store consumer 302 such as shipping information, item information, or personal account information of the item store consumer 302. Further, the consumer view may not provide access to or display information specific to the item store organizer 306 such as the payment information of the item store organizer 306.

FIG. 4 depicts an example workflow for a retail server providing an item store for redemption of items by item store consumers in response to a request by an item store organizer in accordance with aspects of the present disclosure. The retail server 304 may provide the item store to a plurality of item store consumers 302 and a plurality of item store organizers 306.

As shown in FIG. 4 at (1), the retail server 304 obtains an item store request and item store parameters 402 from an item store organizer 306. The item store organizer 306 may designate, through the item store parameters 402, characteristics and/or properties of the item store that the item store organizer 306 has requested. In some embodiments, the retail server 304 previously generated the item store and the retail server 304 updates the previously generated item store based on the item store parameters 402. In the example of FIG. 4, the retail server 304 receives requests for three item stores and corresponding item store parameters: the first item store is "IS001" with item store parameters: items "I12452, I12422, I34633, I92523, I23243, I23461," maximum spend "$30," and expiration date "Jan. 20, 2025"; the second item store is "IS002" with item store parameters: items "I68445, I00004," maximum spend "$0," and expiration date "1 Year"; and a third item store is "IS003" with item store parameters: items "N/A," maximum spend "$25," and expiration date "Mar. 8, 2021 at 8:00 PM PT." In other examples, the retail server 304 may generate more or less item stores and item store parameters and/or each item store may be based on more or less item store parameters or different item store parameters.

At (2), the retail server 304 generates and provides the single use tokens 404 to the item store organizer 306 such that the item store organizer 306 can provide the item store consumers 302 with access to the item stores based at least in part on the item store parameters. The single use tokens 404 may include one or more tokens that provide an item store consumer with initial access to one or more of the item stores prior to the validation of the item store consumer by the retail server 304. An item store consumer 302 may use a single use token 404 once to access an item store before the retail server 304 invalidates the single use token. The retail server 304 may associate each single use token 404 with a number of available redemptions and/or a number of available item stores. In some embodiments, the number of redemptions is included in the item store parameters 402. In the example of FIG. 4, the retail server 304 provides a first single use token "X000000001" with "3" item store redemptions available from item store(s) "IS001, IS002"; a second single use token "X000000002" with "3" item store redemptions available from item store(s) "IS002"; a third single use token "X000000003" with "1" item store redemption available from item store(s) "N/A"; and a fourth single use token "X000000004" with "0" item store redemptions available from item store(s) "0." In other examples, the retail server 304 may provide more or less single use tokens and/or the retail server 304 may provide each single use token with more or less data.

At (3), the retail server 304 obtains one or more redemption requests 406 from the item store consumer 302 to redeem an item from the item store. The one or more redemption requests 406 may include one or more of account information, an item store, a type of redemption for the redemption request, items to be redeemed, cost of the items, and other item information. Further, the one or more redemption requests 406 may include shipping information of the item store consumer 302. In some embodiments, shipping information is obtained by the retail server 304 from the item store consumer 302 prior to the retail server 304 obtaining the one or more redemption requests 406 from the item store consumer 302. Further, the retail server 304 receives the single use tokens 404 from the item store consumer 302 separately from the one or more redemption requests 406 and links the item store consumer 302 to the item store. Based on linking the item store consumer 302 to the item store, an account associated with the item store consumer 302 may be validated for continued access to the item store. For example, the retail server 304 receives an access token 404 from an item store consumer 302 prior to receiving the one or more redemption requests 406 in order to link the item store consumer 302 to the item store for continued access to the item store. Though not shown in FIG. 4, the retail server 304 receives the access token "X000000001" from the item store consumer 302 associated with account "A0001" and validates the account "A0001" for continued access to item stores "IS001" and "IS002." In the example of FIG. 4, the retail server 304 receives redemption requests corresponding to the account "A0001," the item store "IS001," and the items "I12452, I92523, I23461, I32423" with corresponding costs "$12.99, $31.00, $24.99, $10.00." In other examples, the retail server 304 receives more or less redemption requests 406 and/or the redemption requests 406 may provide more or less information.

At (4), the retail server 304 determines the validity of the one or more redemption requests 406 in order to determine if the retail server 304 should fulfill the one or more redemption requests 406. The retail server 304 may validate the one or more redemption requests by confirming that: 1) the account associated with the one or more redemption requests 406 is valid; and 2) the one or more redemption requests 406 satisfy the item store parameters 402. In some embodiments, the retail server 304 validates the one or more redemption requests 406 by confirming that: 1) the item store consumer 302 is linked to the item store; and 2) the one or more redemption requests 406 satisfy the item store parameters 402. In the example of FIG. 4, the retail server determines that the redemption requests 406 for Items "I12452" and "I23461" are valid as each includes a validated account and each satisfies the item store parameters 402. Further, the retail server determines that the redemption request 406 for Item "I92523" is invalid due to the cost exceeding the maximum spend per item as identified by the item store parameters 402 and the redemption request 406 for Item "I32423" is invalid because the item is not included in an item store that the account is associated with.

At (5), based on the validity of one or more of the redemption requests 406, the retail server 304 fulfills the one or more valid redemption requests 406 related to Items "I12452" and "I23461" and transmits the items to the consumer 408 associated with the item store consumer 302. Fulfilling the valid redemption requests 406 may include a two-step redemption process that is based on the payment information of the item store organizer 306 and the shipping information of the item store consumer 302. The retail server 304 may transmit the items to the consumer 408 based on the shipping information for the single use token "X000000001." The consumer 408 may be an address of the item store consumer 302. Further, the retail server 304 may fulfill the redemption requests 406 by charging an account that the retail server 304 obtained from the payment information of the item store organizer 306.

At (6), the retail server may transmit redemption information 410 to the item store organizer 306 in order to provide an indication of the items that the item store consumer 302 redeemed from the item store. The redemption information 410 may include one or more of the single use token that the item store consumer 302 used to initially access the item store, the number of items redeemed by the item store consumer 302, the current spend by the item store consumer 302, or an identifier that an item store consumer redeemed an item. The redemption information 410 may not include information identifying the item store consumer 302, the specific items redeemed by the item store consumer 302. In the example of FIG. 4, the redemption information 410 identifies that an account associated with single use token "X000000001" has used "2" item store redemptions with current spend "$37.98." Further, accounts associated with single use tokens "X000000002, "X000000003," and "X000000004" have each used "0" item store redemptions with current spend "$0."

Figure 5A:
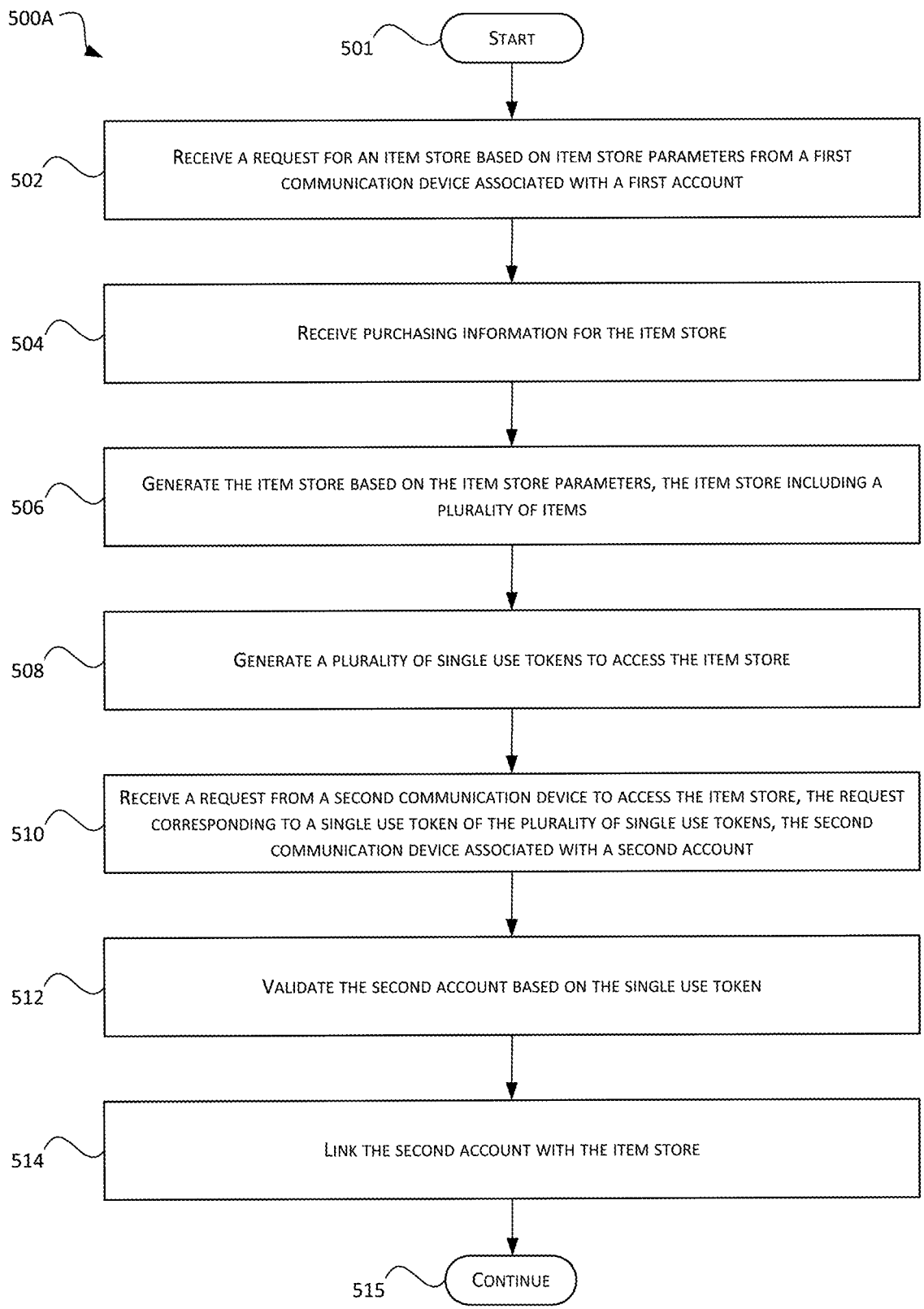
FIG. 5A is a flowchart of an example routine for generating an item store on behalf of an entity and responding to a request received from a user to access the item store.

FIG. 5A describes an illustrative process 500A for receiving a request for an item store based on item store parameters and a single use token to access the item store. The process 500A includes generating the item store based on the item store parameters and validating an item store consumer based on the single use token. By using such a single use token, the item store consumer can avoid providing item store consumer information to the item store organizer and can avoid providing item store organizer information to the item store consumer.

The process 500A begins at block 501. The process 500A begins automatically upon the item store organizer requesting the generation of an item store. In some embodiments, the process 500A begins each time that the item store organizer requests an item store. For example, the process 500A initiates each time the item store organizer requests an item store, whether or not the retail server has previously generated an item store for the item store organizer that satisfies the item store parameters. The process 500A may be embodied in a set of executable program instructions stored on a computer-readable medium, such as one or more disk drives, of a computing system of the retail server. When the process 500A is initiated, the executable program instructions can be loaded into memory, such as RAM, as executed by one or more processors of the computing system.

At block 502, the retail server receives a request for an item store based on item store parameters from a first account via a first communication device in order to implement an item store for item store consumers. The first communication device may provide the item store parameters to the retail server in order to provide the boundaries of the item store. The item store parameters may include one or more of redemptions per item store consumer, price constraints, time constraints, items for the item store, expiration dates, etc. One or more of the item store parameters may be particular to the item store organizer and/or one or more of the item store parameters may be general to multiple item stores and/or multiple item store organizers.

At block 504, the retail server receives payment information for the item store from the first communication device. The retail server may receive the payment information with or separately from the request for the item store. The payment information may include account information to charge in the event of a redemption from the item store. For example, the payment information includes bank account information of the first account. The payment information may include information corresponding to multiple accounts and the retail server may charge a first account in a first situation and a second account in a second situation. In some embodiments, the retail server has previously stored payment information of the first account and does not receive payment information.

At block 506, the retail server generates the item store based on the item store parameters where the item store includes a plurality of items from an electronic catalog. Based on the item store parameters, the retail server may determine characteristics of the requested item store. For example, the retail server determines an expiration date, a number of redemptions associated with the retail server, various price constraints, etc. Further, the retail server may determine a number of items to include in the item store. The item store organizer may, as part of the item store parameters, indicate items for the retail server to include in the item store. In some embodiments, the item store organizer separately indicates items for the retail server to include in the item store. In other embodiments, the item store organizer does not indicate the items to include in the item store. For example, the retail server includes default items in each item store.

At block 508, the retail server generates a plurality of single use tokens that enable an item store consumer to initially access an item store. The retail server may generate the plurality of single use tokens based at least in part on the request for the item store. In some embodiments, the item store parameters include an identified number of recipients and the retail server generates a corresponding number of single use tokens. In other embodiments, the item store organizer separately provides the desired number of single use tokens to the retail server. In other embodiments, the retail server generates a default number of single use tokens. For example, the retail server generates 10, 50, 1000, or any number of single use tokens for each item store. The retail server may further generate additional single use tokens based on input from the item store organizer. For example, via the client interface 100 of FIG. 1, the item store organizer requests additional single use tokens. Subsequent to generating the single use tokens, the retail server may provide the single use tokens to the item store organizer for distribution to item store consumers. In some embodiments, the retail server distributes the single use tokens to the item store consumers.

At block 510, after the item store organizer distributes the single use tokens to the item store consumers, the retail server receives a request to access the item store from a second account via a second communication device. The request may include a single use token of the plurality of single use tokens. For example, the item store consumer generates the request by interacting with a link generated by the retail server for the single use token. In some embodiments, the item store consumer provides the single use token as an input to the retail server based at least in part on requesting to access the item store.

At block 512, the retail server validates the second account based on the single use token. The retail server may validate the second account by determining that the single use token is active and/or valid and corresponds to the item store. The retail server may determine that the single use token is active and/or valid by determining that the single use token has not previously been used to validate an account. In some embodiments, the retail server validates the single use token by comparing the single use token with a data store of the retail server. Subsequent to validating the second account based on the single use token, the retail server may deactivate the single use token based on previously using the single use token to validate the second account. The retail server may also deactivate the single use token after a given time period (e.g., an expiration date). For example, the retail server deactivates the single use token after the single use token has been valid for 24 hours (or any other time period). In some embodiments, the item store organizer deactivates one or more single use tokens on demand via the client interface 100 of FIG. 1.

At block 514, based on validating the second account, the retail server links the first account and the item store. By validating the second account, the retail server may determine that the second account should be provided continued access to the item store. In order to provide continued access, the retail server may link the second account with the item store such that the retail server recognizes that the second account is authorized to access the item store such that a single use token is not required for the second account to access the item store. The process 500A may end at block 515. The retail server may further repeat the process 500A every time a request to generate an item store is obtained. The process 500A may further continue in FIG. 5B at block 517.

Figure 5B:
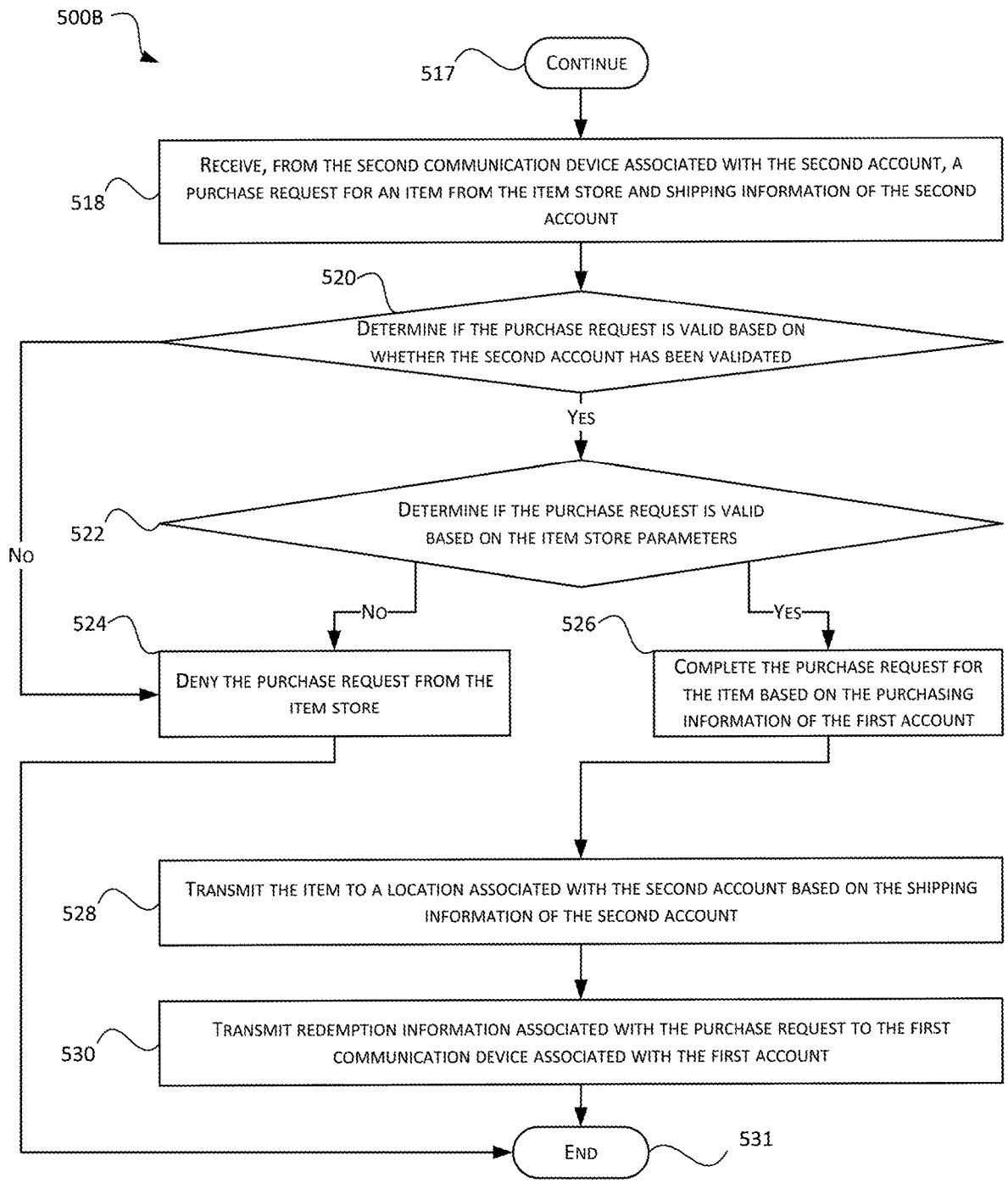
FIG. 5B is a flowchart of an example routine for receiving and responding to a request received from a user to redeem an item from the item store.

FIG. 5B describes an illustrative process 500B for processing a redemption request for an item from an item store consumer and completing the redemption request based on shipping information of the item store consumer and payment information of the item store organizer. FIG. 5B represents a continuation of the illustrative process 500A of FIG. 5A. The process 500B begins at block 517. The process 500B may begin automatically upon the item store being generated and the item store validating an item store consumer based at least in part on the single use token. The process 500B may be embodied in a set of executable program instructions stored on a computer-readable medium, such as one or more disk drives, of a computing system of the retail server. When the process 500B is initiated, the executable program instructions can be loaded into memory, such as RAM, as executed by one or more processors of the computing system.

At block 518, the retail server receives a redemption request for an item from the item store from the second communication device. The retail server may further receive shipping information for the second account from the second communication device. The redemption request may be a request for transmission of an item from the item store based on the shipping information. In some embodiments, the redemption request includes requests for multiple items from the item store. The redemption request may further include an identifier indicating that the second account is linked to the item store and/or that the retail server previously validated the second account.

At block 520, the retail server determines if the redemption request is valid based on whether the second account has been validated by the retail server. Determining if the retail server validated the second account may be a first validation of a two part validation of the redemption request. The retail server may determine that the second account has been validated by the retail server based on a link between the second account and an item store. In some embodiments, the retail server determines whether the second account has previously been validated through the use of a single use token. For example, the second account may include an identifier indicating that the retail server previously validated the second account via a single use token. In other embodiments, the retail server validates the second account based on a single-use token included in the redemption request. In the event that the retail server determines that the second account has not been validated, the process 500B may proceed to block 524. Further, in the event that the retail server determines that the second account includes a deactivated single use token or that the second account is not linked to an item store, the process 500B may proceed to block 524. In the event that the retail server determines that the second account has been validated, the process 500B may proceed to block 522.

At block 522, the retail server determines if the redemption request is valid based on the item store parameters. Determining if the redemption request is valid based on the item store parameters may be a second validation of a two part validation of the redemption request. The retail server may determine whether the redemption request satisfies the item store parameters. For example, the retail server may determine whether the second account has any redemptions remaining, whether the items from the redemption request are in the item store, whether the redemption request satisfies the pricing constraints and time constraints, and whether the expiration date is satisfied. In the event that the retail server determines that the redemption request is not valid based on the item store parameters, the process 500B may proceed to block 524. In the event that the retail server determines that the redemption request is valid, the process 500B may proceed to block 526.

At block 524, the retail server denies the redemption request. Based at least in part on denying the redemption request, the retail server may inform the item store consumer that the redemption request has been denied. In some embodiments, the retail server informs the item store consumer why the redemption request was denied. For example, the retail server informs the item store consumer that the redemption request exceeded price constraints requested by the item store organizer for the particular item store or that the item is not eligible for redemption through the item store. The process 500B may end at block 531.

At block 526, based at least in part on performing the first validation and the second validation of the redemption request, the retail server completes the redemption request for the item based on the payment information of the first account. Completing the redemption request for the item may include charging an account that the retail server parsed from the payment information of the first account. The retail server may charge the account based at least in part on the first account being the item store organizer of the item store.

At block 528, based at least in part on completing the redemption request for the item, the retail server transmits the item to a location based on the shipping information of the second account. Transmitting the item to a location may include delivering the item to a predetermined location. In some embodiments, the location is a physical location. For example, the retail server may transmit the item to a physical address. In other embodiments, the location is an electronic location. For example, the retail server may transmit the item to an electronic address such as a location on a hard disk. In other embodiments, the location is a location on the retail server.

At block 530, the retail server transmits the redemption information of the redemption request to the first communication device. The redemption information may include one or more of an identifier that an item was redeemed, an identifier of the single use token used by the second account, a price of the item that was redeemed, or a number of redemptions left and/or a number of redemptions used by the second account. The redemption information may not include information identifying the shipping information, the second account, the item that was redeemed, or other information personal to the second account. The process 500B may end at block 531.

Figure 6:
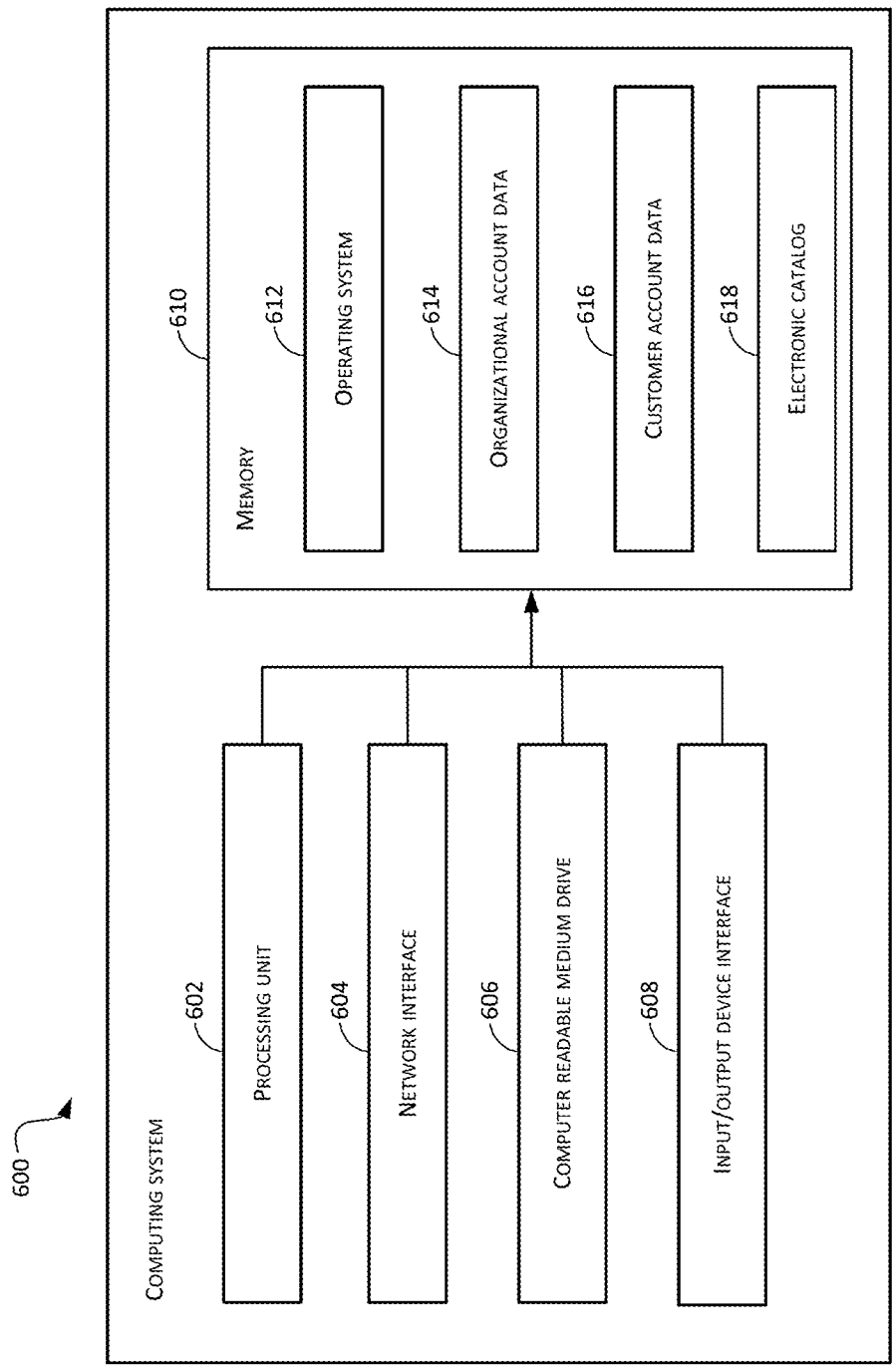
FIG. 6 shows an example computing device that may be used to implement aspects of the present disclosure.

FIG. 6 illustrates an example computing system 600 that executes the processes and implement the features described above. In some embodiments, the computing system 600 includes: one or more processing units 602, such as physical central processing units ("CPUs"); one or more network interfaces 604, such as a network interface cards ("NICs"); one or more computer readable medium drives 606, such as a high density disk ("EIDDs"), solid state drives ("SDDs"), flash drives, and/or other persistent non-transitory computer-readable media; an input/output device interface 608, such as an IO interface in communication with one or more microphones; and one or more computer-readable memories 610, such as random access memory ("RAM") and/or other volatile non-transitory computer-readable media.

The network interface 604 can provide connectivity to one or more networks or computing systems. The one or more processing units 602 can receive information and instructions from other computing systems or services via the network interface 604. The network interface 604 can also store data directly to the computer-readable memory 610. The one or more processing units 602 can communicate to and from the computer-readable memory 610, execute instructions and process data in the computer-readable memory 610, etc.

The computer-readable memory 610 may include computer program instructions that the one or more processing units 602 execute in order to implement one or more embodiments. The computer-readable memory 610 can store an operating system 612 that provides computer program instructions for use by the one or more processing units 602 in the general administration and operation of the computing system 600. The computer-readable memory 610 can further include computer program instructions and other information for implementing aspects of the present disclosure. For example, in one embodiment, the computer-readable memory 610 includes organizational account data 614. As another example, the computer-readable memory 610 may include customer account data 616. Further, the computer-readable memory 610 may include an electronic catalog 618.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry that processes computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An item redemption system comprising:
    an electronic catalog of items available for acquisition;
    organization account data storage configured to store an organization account for an organization associated with the electronic catalog of items, wherein the electronic catalog of items is accessible by the organization account;
    user account data storage configured to store user accounts for the electronic catalog of items, wherein the electronic catalog of items is accessible by the user accounts; and
    a redemption server in communication with the electronic catalog of items, the organization account data storage, and the user account data store storage, wherein the redemption server is configured to at least:
        receive, from a first computing device associated with the organization account stored in the organization account data storage, a store generation request to generate an item store for the organization, wherein the store generation request includes an item store parameter;
        generate the item store for the organization based at least in part on the item store parameter, wherein the item store includes a subset of items from the electronic catalog;
        store, in the organization account data storage, payment information associated with the organization account, wherein the payment information associated with the organization account is linked to the item store in the organization account data storage, wherein a user account stored in the user account data storage cannot access the payment information associated with the organization account and stored in the organization account data storage without first access credentials associated with the organization account;
        generate a plurality of tokens for distribution by the organization to members of the organization, wherein each token of the plurality of tokens enables initial access to the item store;
        receive, from a second computing device associated with the user account, a first access request to access the item store, wherein the first access request includes a token of the plurality of tokens generated for distribution by the organization;
        based at least in part on the token included in the first access request, provide the second computing device access to the item store;
        store, in the user account data storage, shipping information associated with the user account, wherein the shipping information associated with the user account is linked to the item store in the user account data storage, wherein the organization account cannot access the shipping information associated with the user account and stored in the user account data storage without second access credentials associated with the user account;
        receive, from the second computing device, a selection of an item from the subset of items included in the item store;
        obtain, from the organization account data storage, the payment information associated with the organization account;
        obtain, from the user account data storage, the shipping information associated with the user account;
        redeem the item (i) based at least in part on the payment information associated with the organization account and the shipping information associated with the user account, (ii) without providing the user account access to the payment information associated with the organization account stored in the organization account data storage, and (iii) without providing the organization account access to the shipping information associated with the user account stored in the user account data storage, wherein to redeem the item, the redemption server is further configured to at least:
            process payment for the item based at least in part on the payment information associated with the organization account, and
            transmit the item based at least in part on the shipping information associated with the user account; and
        provide, to the first computing device associated with the organization account, a redemption notification for the item, wherein the redemption notification includes information confirming that the item has been redeemed from the item store, and wherein the redemption notification excludes the shipping information associated with the user account.

2. The item redemption system of claim 1, wherein to provide the second computing device access to the item store, the redemption server is configured to at least:
    validate that the token included in the first access request is active;
    link the user account to the item store based at least in part on validating that the token is active; and
    deactivate the token for further use by the user accounts, wherein the access to the item store is based at least in part on linking the user account to the item store.

3. The item redemption system of claim 2, wherein the redemption server is further configured to at least:
    receive, from a third computing device, associated with a second user account stored in the user account data storage, a second access request to access the item store, wherein the second access request includes the token of the plurality of tokens;
    determine that the token has been deactivated; and deny the second access request to access the item store based at least in part on determining that the token has been deactivated.

4. The item redemption system of claim 1, wherein the redemption server is further configured to at least:
receive, from a third computing device, associated with a second user account stored in the user account data storage, a second access request to access the item store;
determine that the second access request does not include a respective token of the plurality of tokens; and
deny the second access request to access the item store based at least in part on determining that the second access request does not include a respective token of the plurality of tokens.

5. An item redemption system comprising:
an electronic catalog of items available for acquisition;
user account data storage configured to store user accounts for the electronic catalog of items, wherein the electronic catalog of items is accessible by the user accounts; and
a redemption server in communication with the electronic catalog of items and the user account data storage, wherein the redemption server is configured to at least:
receive, from a first computing device associated with a first user account stored in the user account data storage, a store generation request to generate an item store for the first user account, wherein the store generation request includes a plurality of item store parameters;
generate the item store for the first user account based at least in part on the plurality of item store parameters, wherein the item store includes a subset of items from the electronic catalog;
store, in the user account data storage, payment information associated with the first user account, wherein the payment information associated with the first user account is linked to the item store in the user account data storage, wherein a second user account cannot access the payment information associated with the first user account and stored in the user account data storage without first access credentials associated with the first user account;
generate a plurality of tokens, wherein each token of the plurality of tokens enables initial access to the item store;
receive, from a second computing device associated with the second user account stored in the user account data storage, an access request to access the item store, wherein the access request includes a token of the plurality of tokens;
based at least in part on the token included in the access request, provide the second computing device access to the item store;
store, in the user account data storage, shipping information associated with the second user account, wherein the shipping information associated with the second user account is linked to the item store in the user account data storage, wherein the first user account cannot access the shipping information associated with the second user account and stored in the user account data storage without second access credentials associated with the second user account;
receive, from the second computing device, a selection of an item in the item store;
obtain, from the user account data storage, the payment information associated with the first user account;
obtain, from the user account data storage, the shipping information associated with the second user account;
redeem the item (i) based at least in part on the payment information associated with the first user account and the shipping information associated with the second user account, (ii) without providing the second user account access to the payment information associated with the first user account stored in the user account data storage, and (iii) without providing the first user account access to the shipping information associated with the second user account stored in the user account data storage; and
provide, to the first computing device, a redemption notification for the item, wherein the redemption notification includes information confirming that the item has been redeemed from the item store, and wherein the redemption notification excludes the shipping information associated with the second user account.

6. The item redemption system of claim 5, wherein to provide the second computing device access to the item store, the redemption server is configured to at least:
validate that the token included in the access request is active;
link the second user account to the item store based at least in part on validating that the token is active; and
deactivate the token for further use by the user accounts, wherein the access to the item store is based at least in part on linking the second user account to the item store.

7. The item redemption system of claim 6, wherein the redemption server is further configured to at least:
receive, from a third computing device, associated with a third user account stored in the user account data storage, a second access request to access the item store, wherein the second access request includes the token of the plurality of tokens;
determine that the token has been deactivated; and
deny the second access request to access the item store based at least in part on determining that the token has been deactivated.

8. The item redemption system of claim 5, wherein the redemption server is further configured to at least:
receive, from a third computing device, associated with a third user account stored in the user account data storage, a second access request to access the item store;
determine that the second access request does not include a respective token of the plurality of tokens; and
deny the second access request to access the item store based at least in part on determining that the second access request does not include a respective token of the plurality of tokens.

9. The item redemption system of claim 5, wherein the redemption server is further configured to at least:
receive, from a third computing device, associated with a third user account stored in the user account data storage, a second access request to access the item store, wherein the second access request includes a respective token of the plurality of tokens;
based at least in part on the respective token included in the second access request, provide the third computing device access to the item store;
receive, from the third computing device, a second selection for a second item from the item store;
determine that the second selection does not satisfy one or more of the plurality of item store parameters; and deny the second selection based at least in part on determining that the second selection does not satisfy the one or more of the plurality of item store parameters.

10. The item redemption system of claim 5, wherein the redemption notification includes one or more of:
   a price of the item;
   an identifier of the token;
   a number of items redeemed; or
   a confirmation that the token has been used to redeem the item.

11. The item redemption system of claim 5, wherein the plurality of item store parameters comprises at least one of:
   an identification of at least one item to include in the item store;
   a price restriction for at least one item in the item store;
   an expiration date of the item store;
   a maximum number of items in the item store that can be redeemed; or
   a deactivation date for the token.

12. The item redemption system of claim 11, wherein one of the plurality of item store parameters comprises an identification of at least one item in the item store, wherein the redemption server is further configured to at least, based at least in part on the identification of the at least one item to include in the item store, automatically generate a subset of items to include in the item store, and wherein the subset of items automatically generated includes the at least one item.

13. A computer-implemented method comprising:
   receiving, from a first computing device associated with a first user account stored in a user account data storage configured to store user accounts for an electronic catalog of items, wherein the electronic catalog of items is accessible by the user accounts, a store generation request to generate an item store for the first user account, wherein the store generation request includes a plurality of item store parameters;
   generating the item store for the first user account based at least in part on the plurality of item store parameters;
   storing, in the user account data storage, payment information associated with the first user account, wherein the payment information associated with the first user account is linked to the item store in the user account data storage, wherein a second user account cannot access the payment information associated with the first user account and stored in the user account data storage without first access credentials associated with the first user account;
   receiving, from a second computing device associated with the second user account stored in the user account data storage, an access request to access the item store, wherein the access request is based at least in part on an account authentication of the second user account by the first user account, wherein the account authentication is based at least in part on an authentication procedure;
   based at least in part on the account authentication of the second user account, providing the second computing device access to the item store;
   storing, in the user account data storage, shipping information associated with the second user account, wherein the shipping information associated with the second user account is linked to the item store in the user account data storage, wherein the first user account cannot access the shipping information associated with the second user account and stored in the user account data storage without second access credentials associated with the second user account;
   receiving, from the second computing device, a selection of an item from the item store;
   obtaining, from the user account data storage, the payment information associated with the first user account;
   obtaining, from the user account data storage, the shipping information associated with the second user account;
   redeeming the item (i) based at least in part on the payment information associated with the first user account and the shipping information associated with the second user account, (ii) without providing the second user account access to the payment information associated with the first user account stored in the user account data storage, and (iii) without providing the first user account access to the shipping information associated with the second user account stored in the user account data storage; and
   providing, to the first computing device, a redemption notification for the item, wherein the redemption notification includes information confirming that the item has been redeemed from the item store, and wherein the redemption notification excludes the shipping information associated with the second user account.

14. The computer-implemented method of claim 13, wherein providing the second computing device access to the item store comprises:
   validating that the account authentication is active;
   linking the second user account to the item store based at least in part on validating that the account authentication is active; and
   deactivating the account authentication for further use by the user accounts,
   wherein the access to the item store is based at least in part on linking the second user account to the item store.

15. The computer-implemented method of claim 14, further comprising:
   receiving, from a third computing device, associated with a third user account stored in the user account data storage, a second access request to access the item store, wherein the second access request is based at least in part on the account authentication;
   determining that the account authentication has been deactivated; and
   denying the second access request to access the item store based at least in part on determining that the account authentication has been deactivated.

16. The computer-implemented method of claim 13, further comprising:
   receiving, from a third computing device, associated with a third user account stored in the user account data storage, a second access request to access the item store;
   determining that the second access request is not based at least in part on a respective account authentication; and
   denying the second access request to access the item store based at least in part on determining that the second access request is not based at least in part on a respective account authentication.

17. The computer-implemented method of claim 13, further comprising:
   receiving, from a third computing device, associated with a third user account stored in the user account data storage, a second access request to access the item store, wherein the second access request is based at least in part on a respective account authentication of the third user account by the first user account;

based at least in part on the respective account authentication of the third account, providing the third computing device access to the item store;

receiving, from the third computing device, a second selection for a second item from the item store;

determining that the second selection does not satisfy one or more of the plurality of item store parameters; and denying the second selection based at least in part on determining that the second selection does not satisfy the one or more of the plurality of item store parameters.

18. The computer-implemented method of claim 13, wherein the redemption notification includes one or more of:
a price of the item;
an identifier of the authentication procedure;
a number of items redeemed; or
a confirmation that the authentication procedure has been used to redeem the item.

19. The computer-implemented method of claim 13, wherein the plurality of item store parameters comprises at least one of:
an identification of at least one item to include in the item store;
a price restriction for at least one item in the item store;
a maximum number of items in the item store that can be redeemed; or
an expiration date of the account authentication.

20. The computer-implemented method of claim 19, wherein one of the plurality of item store parameters comprises an identification of at least one item in the item store, wherein the computer-implemented method further comprises based at least in part on the identification of the at least one item to include in the item store, automatically generating a subset of items to include in the item store, and wherein the subset of items automatically generated includes the at least one item.

* * * * *